(12) United States Patent
Mitsunobu et al.

(10) Patent No.: US 12,385,111 B2
(45) Date of Patent: Aug. 12, 2025

(54) HOT STAMPED STEEL

(71) Applicant: NIPPON STEEL CORPORATION, Tokyo (JP)

(72) Inventors: Takuya Mitsunobu, Tokyo (JP); Kohei Tokuda, Tokyo (JP); Takehiro Takahashi, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/632,553

(22) PCT Filed: Aug. 28, 2020

(86) PCT No.: PCT/JP2020/032643
§ 371 (c)(1),
(2) Date: Feb. 3, 2022

(87) PCT Pub. No.: WO2021/039971
PCT Pub. Date: Mar. 4, 2021

(65) Prior Publication Data
US 2022/0275481 A1   Sep. 1, 2022

(30) Foreign Application Priority Data

Aug. 29, 2019   (JP) ................. 2019-157205

(51) Int. Cl.
*C22C 18/00*   (2006.01)
*B32B 15/01*   (2006.01)
(Continued)

(52) U.S. Cl.
CPC ............ *C22C 18/00* (2013.01); *B32B 15/012* (2013.01); *B32B 15/013* (2013.01); *B32B 15/04* (2013.01);
(Continued)

(58) Field of Classification Search
CPC ......... C22C 30/02; C22C 30/06; C22C 30/00; C22C 21/00; C22C 21/06; C22C 21/10;
(Continued)

(56) References Cited

U.S. PATENT DOCUMENTS 6,231,688 B1 * 5/2001 Ishii ..................... C23C 22/362
                                                                 252/396
2011/0303328 A1   12/2011 Kondo et al.
(Continued)

FOREIGN PATENT DOCUMENTS

EP          653502 A2 *  5/1995 ............... C23C 2/26
EP         1050603 A1   11/2000
(Continued)

*Primary Examiner* — Michael E. La Villa
(74) *Attorney, Agent, or Firm* — Renner, Otto, Boisselle & Sklar, LLP (57) ABSTRACT

A hot stamped steel includes a base material that is formed of steel, a plated layer that is formed on a surface of the base material, and a phosphate coating that is formed on a surface of the plated layer; chemical composition of the plated layer contains 20.00 to 45.00 mass % of Al, 10.00 to 45.00 mass % of Fe, 4.50 to 15.00 mass % of Mg, 0.10 to 3.00 mass % of Si, 0.05 to 3.00 mass % of Ca, and the plated layer may further contain one or more of Sb, Pb, Cu, Sn, Ti, Sr, Cr, Ni, and Mn with a remainder of Zn and impurities; the phosphate coating comprises zinc phosphate crystals containing 5.0 to 50.0 mass % of Mg and 0.5 to 5.0 mass % of Ca; and the adhesion amount of the phosphate coating per one surface is in a range of 0.1 to 10.0 g/m².

4 Claims, 1 Drawing Sheet

(51) Int. Cl.

| | |
|---|---|
| *B32B 15/04* | (2006.01) |
| *B32B 15/18* | (2006.01) |
| *C22C 18/04* | (2006.01) |
| *C22C 21/00* | (2006.01) |
| *C22C 21/06* | (2006.01) |
| *C22C 21/10* | (2006.01) |
| *C22C 30/00* | (2006.01) |
| *C22C 30/02* | (2006.01) |
| *C22C 30/06* | (2006.01) |
| *C22C 38/00* | (2006.01) |
| *C22C 38/06* | (2006.01) |
| *C23C 2/06* | (2006.01) |
| *C23C 2/12* | (2006.01) |
| *C23C 2/20* | (2006.01) |
| *C23C 2/26* | (2006.01) |
| *C23C 2/28* | (2006.01) |
| *C23C 2/40* | (2006.01) |
| *C23C 22/07* | (2006.01) |
| *C23C 22/12* | (2006.01) |
| *C23C 22/83* | (2006.01) |
| *C23C 28/00* | (2006.01) |
| *C23C 30/00* | (2006.01) |
| *C25D 11/36* | (2006.01) |
| *C25D 13/20* | (2006.01) |
| *C21D 1/18* | (2006.01) |
| *C21D 1/673* | (2006.01) |
| *C21D 7/13* | (2006.01) |
| *C21D 8/02* | (2006.01) |
| *C21D 9/46* | (2006.01) |
| *C22C 38/04* | (2006.01) |
| *C25D 13/22* | (2006.01) |

(52) U.S. Cl.
CPC ............ *B32B 15/043* (2013.01); *B32B 15/18* (2013.01); *C22C 18/04* (2013.01); *C22C 21/00* (2013.01); *C22C 21/06* (2013.01); *C22C 21/10* (2013.01); *C22C 30/00* (2013.01); *C22C 30/02* (2013.01); *C22C 30/06* (2013.01); *C22C 38/002* (2013.01); *C22C 38/06* (2013.01); *C23C 2/06* (2013.01); *C23C 2/12* (2013.01); *C23C 2/20* (2013.01); *C23C 2/26* (2013.01); *C23C 2/261* (2022.08); *C23C 2/28* (2013.01); *C23C 2/29* (2022.08); *C23C 2/40* (2013.01); *C23C 22/07* (2013.01); *C23C 22/12* (2013.01); *C23C 22/83* (2013.01); *C23C 28/00* (2013.01); *C23C 28/30* (2013.01); *C23C 28/321* (2013.01); *C23C 28/3225* (2013.01); *C23C 28/34* (2013.01); *C23C 28/345* (2013.01); *C23C 30/00* (2013.01); *C23C 30/005* (2013.01); *C25D 11/36* (2013.01); *C25D 13/20* (2013.01); *C21D 1/18* (2013.01); *C21D 1/673* (2013.01); *C21D 7/13* (2013.01); *C21D 8/0247* (2013.01); *C21D 8/0257* (2013.01); *C21D 8/0278* (2013.01); *C21D 9/46* (2013.01); *C22C 38/00* (2013.01); *C22C 38/04* (2013.01); *C25D 13/22* (2013.01); *Y10T 428/12597* (2015.01); *Y10T 428/12604* (2015.01); *Y10T 428/12611* (2015.01); *Y10T 428/1266* (2015.01); *Y10T 428/12667* (2015.01); *Y10T 428/12729* (2015.01); *Y10T 428/12757* (2015.01); *Y10T 428/12799* (2015.01); *Y10T 428/12958* (2015.01); *Y10T 428/12972* (2015.01); *Y10T 428/12979* (2015.01); *Y10T 428/27* (2015.01)

(58) Field of Classification Search
CPC ......... C22C 18/00; C22C 18/04; C22C 38/00; C22C 38/04; C22C 38/06; C22C 38/002; B32B 15/013; B32B 15/012; B32B 15/04; B32B 15/043; B32B 15/18; C23C 2/06; C23C 2/12; C23C 2/20; C23C 2/26; C23C 2/28; C23C 2/40; C23C 2/29; C23C 2/261; C23C 22/12; C23C 22/83; C23C 22/07; C23C 28/00; C23C 28/30; C23C 28/321; C23C 28/3225; C23C 28/34; C23C 28/345; C23C 30/00; C23C 30/005; C25D 11/36; C25D 13/20; C25D 13/22; C21D 1/18; C21D 1/673; C21D 7/13; C21D 8/0247; C21D 8/0257; C21D 8/0278; C21D 9/46; Y10T 428/12972; Y10T 428/12979; Y10T 428/12799; Y10T 428/1266; Y10T 428/12667; Y10T 428/12958; Y10T 428/12757; Y10T 428/12597; Y10T 428/12604; Y10T 428/12611; Y10T 428/12729; Y10T 428/27

See application file for complete search history.

(56) References Cited

U.S. PATENT DOCUMENTS

| | | |
|---|---|---|
| 2017/0211188 A1 | 7/2017 | Miura |
| 2020/0002798 A1 | 1/2020 | Tokuda |

FOREIGN PATENT DOCUMENTS

| | | |
|---|---|---|
| JP | 08013154 A | 1/1996 |
| JP | 2012-112010 A | 6/2012 |
| JP | 2016-089232 A | 5/2016 |
| JP | 2017-066459 A | 4/2017 |
| JP | 2018-090879 A | 6/2018 |
| JP | 6443596 B1 | 12/2018 |
| WO | 2013/153682 A1 | 10/2013 |
| WO | 2018/139620 A1 | 8/2018 |

* cited by examiner

HOT STAMPED STEEL

TECHNICAL FIELD OF THE INVENTION

The present invention relates to a hot stamped steel.

Priority is claimed on Japanese Patent Application No. 2019-157205, filed Aug. 29, 2019, the content of which is incorporated herein by reference.

BACKGROUND ART

In recent years, the inhibition of the consumption of a chemical fuel has been requested for the protection of environment and the prevention of global warming. Such a request is no exception to, for example, vehicles that are indispensable for daily life and activities as transportation. Regarding such a request, the improvement of fuel efficiency and the like obtained from a reduction in the weight of the vehicle body has been examined for a vehicle. Since most of the structure of a vehicle is formed of iron, particularly, a steel sheet, reducing the thickness of the steel sheet to reduce weight is very effective in terms of reducing the weight of a vehicle body. However, since the strength of a structure is reduced in a case where the thickness of the steel sheet is simply reduced to reduce the weight of the steel sheet, there is a concern that safety is reduced. For this reason, in order to reduce the thickness of the steel sheet, it is necessary to increase the mechanical strength of the steel sheet to be used so that the strength of the structure is not reduced.

Accordingly, a steel sheet, of which the mechanical strength can be maintained or increased due to an increase in the mechanical strength of the steel sheet even though the steel sheet is made to be thinner than the steel sheet having been used in the past, has been researched and developed. There is a request for such a steel sheet not only in a vehicle manufacturing industry but also in various manufacturing industries.

In general, a material having a high mechanical strength tends to have low shape fixability in forming, such as bending. For this reason, in a case where this material is to be worked into a complicated shape, the working of the material is difficult. Examples of one of methods of solving a problem about formability include so-called "a hot-pressing method (a hot stamping method, a high-temperature pressing method, and a die quenching method)". In this hot-pressing method, a material, which is an object to be formed, is heated to a high temperature once, and the material softened by heating is cooled after being formed by press working or is cooled simultaneously with forming.

According to this hot-pressing method, since a material is heated to a high temperature once to be softened and press working is performed in a state where the material is softened, press working can be easily performed on the material. Accordingly, a press-formed article, which has both good shape fixability and high mechanical strength, is obtained by this hot press working. In particular, in a case where the material is steel, the mechanical strength of the press-formed article can be increased by a quenching effect obtained from cooling performed after forming.

However, in a case where this hot-pressing method is applied to a steel sheet, the steel sheet is heated to a high temperature of, for example, 800° C. or higher, so that iron and the like of the surface of the steel sheet are oxidized and scales (oxides) are generated. Accordingly, since a step of removing the scales (descaling step) is required after hot press working is performed, productivity is reduced. Further, in a member and the like requiring corrosion resistance, antirust treatment or metal coating needs to be performed on the surface of the member after working. For this reason, a surface cleaning step and a surface treatment step are required, so that productivity is reduced as well.

A method of performing coating, such as plating, on a steel sheet, which is not yet subjected to hot stamping, to improve corrosion resistance and to omit a descaling step is considered to be an example of a method of inhibiting such a reduction in productivity.

A plated steel sheet for hot pressing, which includes an Al—Zn-based alloy plating layer formed on the surface of a steel sheet and containing 20 to 95 mass % of Al, 0.01 to 10 mass % of Ca+Mg, and Si, is disclosed in, for example, Patent Document 1 as such a plated steel material. According to Patent Document 1, it is disclosed that the generation of scales is inhibited during heating performed before hot pressing, plating does not adhere to dies during hot pressing, and a hot-pressed member to be obtained has good appearance and has excellent coating adhesion and excellent corrosion resistance.

Further, Patent Document 2 discloses a plated steel material which includes a plated layer formed on the surface of a steel material and including an Al—Fe alloy layer and a Zn—Mg—Al alloy layer and of which corrosion resistance is dramatically improved.

Members obtained by hot stamping the above-mentioned plated steel are often applied to vehicle components, and phosphating treatment is performed on these members in a case where these members are applied as vehicle components. However, properties obtained in a case where a phosphate coating is formed are not examined at all in Patent Documents 1 and 2.

As a result of examination performed by the inventors, it has been found that there is a case where a zinc phosphate film is not easily formed even though a member obtained by hot stamping a steel sheet including a plated layer containing Al or Zn is subjected to zinc phosphate treatment that is general phosphating treatment for vehicle, or coating film adhesion is not sufficient in a case where an electrodeposition coating film or the like is formed on the surface of a zinc phosphate film even if the zinc phosphate film is formed.

Patent Document 3 discloses a method of treating the surface of a zinc-aluminum-magnesium alloy plated steel sheet with a metal surface treatment agent. Patent Document 3 discloses a method in which a fluorine compound is made to be contained in a chemical conversion solution to form a reaction layer, which contains aluminum fluoride and magnesium fluoride, on the surface of a plated layer of the plated steel sheet by phosphating treatment and adhesion between a phosphate coating and the surface of the plated layer can be further improved.

However, coating film adhesion in a case where an electrodeposition coating film or the like is formed on the phosphate coating is not examined in Patent Document 3.

PRIOR ART DOCUMENT

Patent Document

[Patent Document 1] Japanese Unexamined Patent Application, First Publication No. 2012-112010
[Patent Document 2] Japanese Unexamined Patent Application, First Publication No. 2017-66459
[Patent Document 3] Japanese Unexamined Patent Application, First Publication No. 2016-89232

DISCLOSURE OF THE INVENTION

Problems to be Solved by the Invention

The invention has been made in consideration of the above-mentioned problem. An object of the invention is to provide a hot stamped steel including a phosphate coating in which defect in phosphate coating is inhibited and which is excellent in coating film adhesion.

Means for Solving the Problem

The inventors found that a hot stamped steel including a phosphate coating, in which defect in phosphate coating is inhibited and which is excellent in coating film adhesion, is obtained in a case where the composition balance of a plated layer of a hot-dip Zn—Al—Mg-plated steel sheet and conditions during the manufacture thereof are controlled.

The invention has been completed on the basis of the above-mentioned knowledge, and the gist thereof is as follows.

(1) A hot stamped steel according to an aspect of the invention includes a base material that is formed of steel, a plated layer that is formed on a surface of the base material, and a phosphate coating that is formed on a surface of the plated layer. Chemical composition of the plated layer contains 20.00 to 45.00 mass % of Al, 10.00 to 45.00 mass % of Fe, 4.50 to 15.00 mass % of Mg, 0.10 to 3.00 mass % of Si, 0.05 to 3.00 mass % of Ca, 0 to 0.50 mass % of Sb, 0 to 0.50 mass % of Pb, 0 to 1.00 mass % of Cu, 0 to 1.00 mass % of Sn, 0 to 1.00 mass % of Ti, 0 to 0.50 mass % of Sr, 0 to 1.00 mass % of Cr, 0 to 1.00 mass % of Ni, and 0 to 1.00 mass % of Mn with a remainder of Zn and impurities. The phosphate coating comprises zinc phosphate crystals containing 5.0 to 50.0 mass % of Mg and 0.5 to 5.0 mass % of Ca, and the adhesion amount of the phosphate coating per one surface is in a range of 0.1 to 10.0 g/m².

(2) In the hot stamped steel according to (1), the chemical composition of the plated layer may contain one or both of 25.00 to 35.00 mass % of Al and 6.00 to 10.00 mass % of Mg.

(3) In the hot stamped steel according to (1) or (2), the adhesion amount of the phosphate coating per one surface may be in a range of 1.5 to 8.0 g/m².

Effects of the Invention

According to the aspect of the invention, it is possible to provide a hot stamped steel including a phosphate coating in which defect in phosphate coating is inhibited and which is excellent in coating film adhesion.

EMBODIMENTS OF THE INVENTION

A hot stamped steel according to an embodiment of the invention (a hot stamped steel according to this embodiment) will be described with reference to the drawings.

Figure 1:
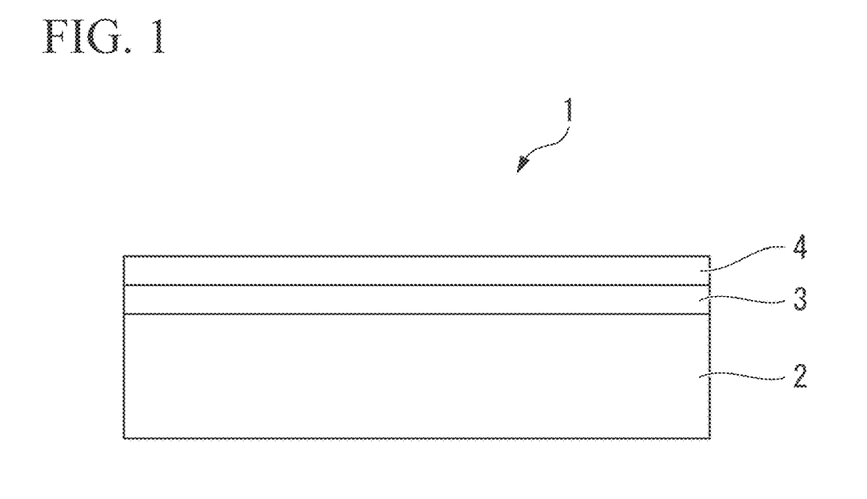
FIG. 1 is a schematic diagram showing a hot stamped steel according to an embodiment.

In FIG. 1, the hot stamped steel 1 according to this embodiment includes a base material 2 that is formed of steel, a plated layer 3 that is formed on the surface of the base material 2, and a phosphate coating 4 that is formed on the surface of the plated layer 3. The plated layer 3 and the phosphate coating 4 are formed on only one surface of the base material 2 in FIG. 1, but may be formed on both surfaces thereof <Base Material>

The base material 2 is formed of steel. The base material 2 is, for example, a hot stamped member that is obtained by the hot stamping of a steel sheet. For this reason, the base material 2 has the shape of a sheet in FIG. 1 but the shape of the base material 2 is not limited.

Further, in the hot stamped steel 1 according to this embodiment, the plated layer 3 and the phosphate coating 4 are important and the chemical composition and the like of the base material 2 are not particularly limited. With regard to the base material 2, steel to be subjected to plating, hot stamping, and phosphating treatment may be determined depending on a product to which the base material 2 is to be applied or strength, a sheet thickness, and the like to be required for the base material 2. For example, a hot-rolled steel sheet described in JIS G3193:2008 or a cold-rolled steel sheet described in JIS G3141:2017 can be used as the base material.

<Plated Layer>

[Chemical Composition]

Hereinafter, % related to the chemical composition of the plated layer and the phosphate coating is mass % unless otherwise noted.

Al: 20.00 to 45.00%

Al is an element that is essential to improve the corrosion resistance of the plated layer 3. Further, in a case where the Al content is less than 20.00%, an intermetallic compound, which is mainly composed of Ca and Al and inhibits the evaporation of Zn and Mg and serves as a supply source of Ca to be supplied to the phosphate coating layer during the heating of hot stamping, is not produced sufficiently on the surface of the plated layer. As a result, the defect in phosphate coating of the phosphate coating 4 formed on the plated layer 3 becomes large. For this reason, the Al content is set to 20.00% or more. The Al content is preferably 25.00% or more.

On the other hand, even though the Al content exceeds 45.00%, it is difficult for an intermetallic compound, which is mainly composed of Ca and Al, to be produced on the surface of the plated layer 3 during the heating of hot stamping. As a result, the defect in phosphate coating of the phosphate coating 4 becomes large. For this reason, the Al content is set to 45.00% or less. The Al content is preferably 35.00% or less.

Fe: 10.00 to 45.00%

Since Fe is diffused into the plated layer 3 from the base material 2 in a case where a plated steel sheet is heated during hot stamping, Fe is necessarily contained in the plated layer 3 of the hot stamped steel 1.

In a case where the Fe content is less than 10.0%, spot weldability and a deposition property tend to deteriorate. Accordingly, the Fe content is set to 10.00% or more.

On the other hand, in a case where the Fe content is excessively high, corrosion resistance tends to deteriorate. For this reason, the Fe content is set to 45.00% or less.

Mg: 4.50 to 15.00%

Mg is an element that contributes to the improvement of the corrosion resistance of the plated layer 3. Further, since Mg is combined with a Zn component contained in the plated layer 3 and prevents liquid Zn from being generated during the heating of hot stamping, Mg also has an effect of inhibiting LME cracks. Furthermore, in the hot stamped steel 1 according to this embodiment, Mg is an element that is diffused into the phosphate coating 4 and improves coating film adhesion. In order to obtain these effects, the Mg content is set to 4.50% or more. In a case where the Mg content is less than 4.50%, coating film adhesion is reduced. The Mg content is preferably 6.0% or more.

On the other hand, in a case where the Mg content exceeds 15.00%, sacrificial protection works excessively. As a result, the corrosion resistance of the plated layer 3 tends to be reduced. Further, a large amount of Mg-based intermetallic compound, which deteriorates phosphate treatability, is formed in the plated layer 3, so that the defect in phosphate coating of the phosphate coating 4 becomes large and coating film adhesion is reduced. For this reason, the Mg content is set to 15.00% or less. The Mg content is preferably set to 10.00% or less.

Si: 0.10 to 3.00%

Si is an element that forms a compound together with Mg and contributes to the improvement of corrosion resistance. Further, Si is also an element that inhibits an alloy layer, which is to be formed between the surface of the steel sheet and the plated layer, from being thick excessively to have an effect of improving adhesion between the steel sheet and the plated layer in a case where the plated layer is to be formed on the steel sheet. In a case where the Si content is less than 0.10%, these effects are not obtained sufficiently. For this reason, the Si content is set to 0.10% or more.

On the other hand, in a case where the Si content exceeds 3.00%, $Mg_2Si$, $Mg_2Ca$, or $(Mg,Ca)_2Si$ is formed. For this reason, the Mg content and the Ca content of the phosphate coating 4 are insufficient and coating film adhesion is reduced. Further, in a case where a Si phase is excessively produced, resistance to chipping and seizure resistance are reduced. For this reason, the Si content is set to 3.00% or less.

Ca: 0.05 to 3.00%

In the hot stamped steel 1 according to this embodiment, Ca is an element that is diffused into the phosphate coating 4 and improves coating film adhesion. In a case where the Ca content is less than 0.05%, the defect in phosphate coating of the phosphate coating 4 becomes large. For this reason, the Ca content is set to 0.05% or more.

On the other hand, in a case where the Ca content exceeds 3.00%, an intermetallic compound mainly composed of Ca, which deteriorates phosphate treatability, is formed. For this reason, the Mg content and the Ca content of the phosphate coating are insufficient and defect in phosphate coating becomes large, so that coating film adhesion is reduced. For this reason, the Ca content is set to 3.00% or less.

Basically, the plated layer 3 of the hot stamped steel 1 according to this embodiment contains the above-mentioned elements with a remainder of Zn and impurities.

However, the plated layer 3 may contain Sb, Pb, Cu, Sn, Ti, Sr, Cr, Ni, and Mn in the following ranges in addition to the above-mentioned elements. Since these elements do not necessarily need to be contained, the lower limits of the amounts thereof are 0%. Further, it is preferable that the total amount of these elements is 5.00% or less.

Sb: 0 to 0.50%
Pb: 0 to 0.50%
Cu: 0 to 1.00%
Sn: 0 to 1.00%
Ti: 0 to 1.00%

Sb, Pb, Cu, Sn, and Ti are substituted with Zn in the plated layer 3 and form a solid solution in $MgZn_2$ phase. However, as long as Sb, Pb, Cu, Sn, and Ti are in predetermined amount ranges, Sb, Pb, Cu, Sn, and Ti do not adversely affect the properties of the hot stamped steel 1. Accordingly, these elements may be contained in the plated layer 3. However, in a case where the amounts of the respective elements are excessive, the oxides of these elements are precipitated during the heating of hot stamping and the surface properties of the hot stamped steel 1 deteriorate, so that phosphate treatability tends to be reduced. Further, in a case where the Pb content and the Sn content are excessive, a deposition property and LME resistance also deteriorate.

For this reason, each of the Sb content and the Pb content is set to 0.50% or less and each of the Cu content, the Sn content, and the Ti content is set to 1.00% or less. It is preferable that the Sb content and the Pb content are set to 0.20% or less. The Cu content, the Sn content, and the Ti content are preferably 0.80% or less and more preferably 0.50% or less.

Sr: 0 to 0.50%

Sr is an element that is effective to inhibit the production of top dross formed on a plating bath during manufacturing. Further, since Sr inhibits atmospheric oxidation during the heat treatment of hot stamping, Sr is an element that inhibits a change in the color of the plated steel sheet subjected to the heat treatment. For this reason, Sr may be contained in the plated layer. In order to obtain the above-mentioned effects, it is preferable that the Sr content is set to 0.05% or more.

On the other hand, in a case where the Sr content is excessive, Sr adversely affects a coating film-blistering width and flow rust in a corrosion test. For this reason, the Sr content is set to 0.50% or less. The Sr content is preferably set to 0.30% or less and is more preferably set to 0.10% or less.

Cr: 0 to 1.00%
Ni: 0 to 1.00%
Mn: 0 to 1.00%

Cr, Ni, and Mn are elements that are concentrated near an interface between the plated layer and the base material in the plated steel sheet, and have an effect of eliminating spangles formed on the surface of the plated layer, and the like. Accordingly, one or more selected from Cr, Ni, and Mn may be contained in the plated layer 3. In a case where these effects are to be obtained, it is preferable that each of the Cr content, the Ni content, and the Mn content is set to 0.01% or more.

On the other hand, in a case where the amounts of these elements are excessive, a coating film-blistering width and flow rust are increased, so that corrosion resistance tends to deteriorate. Accordingly, each of the Cr content, the Ni content, and the Mn content is set to 1.00% or less. Each of the Cr content, the Ni content, and the Mn content is preferably set to 0.50% or less and is more preferably set to 0.10% or less.

The plated layer is dissolved and exfoliated and the amounts of elements contained in the exfoliated plated layer are analyzed by inductively coupled plasma (ICP)-atomic emission spectrometry, so that the average composition of the plated layer is measured. With regard to the exfoliation of the plated layer, for example, the hot stamped steel is immersed in 10%-hydrochloric acid to which an inhibitor (pickling inhibitor: manufactured by ASAHI Chemicals Co., Ltd.) for inhibiting the corrosion of base material is added, and it may be determined that the dissolution is completed in a case where foaming stops.

The structure of the plated layer is not limited, but includes, for example, a Fe—Al phase, a Zn—Mg phase, and a Zn—Al—Mg phase. Further, the adhesion amount of the plated layer is not limited, but is preferably in the range of 10 to 120 g/m$^2$. The adhesion amount of the plated layer can be obtained from a change in weight before and after the plated layer is dissolved at a room temperature by the above-mentioned method.

<Phosphate Coating>

[The Phosphate Coating Comprises Zinc Phosphate Crystals Containing 5.0 to 50.0 Mass % of Mg and 0.5 to 5.0 Mass % of Ca]

Usually, an oxide mainly consisting of $Al_2O_3$ is formed on the surface (the surface of a plated layer) of a hot stamped steel obtained by hot stamping a steel that includes the plated layer containing Al. $Al_2O_3$ formed on the surface of the plated layer hinders the formation of the phosphate coating. Accordingly, in a case where phosphating treatment is performed on the plated steel which includes $Al_2O_3$ formed on the surface thereof, the proportion of defect in phosphate coating of the phosphate coating becomes large in the hot stamped steel.

Figure 2:
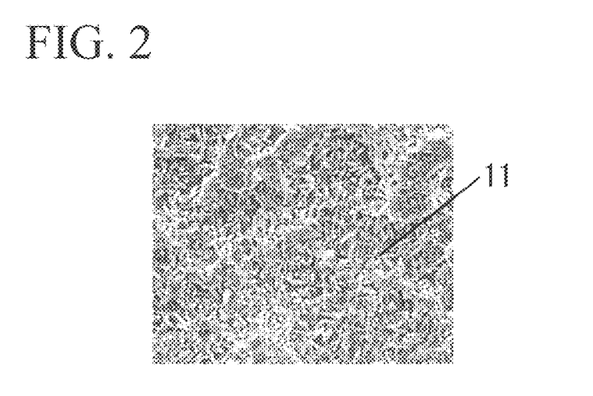
FIG. 2 is a diagram showing an example of the structure of a phosphate coating of the hot stamped steel according to this embodiment.

In contrast, in the hot stamped steel according to this embodiment, plating is performed by a method to be described later. Accordingly, an oxide film mainly composed of Ca and Mg is formed on the surface of the plated steel that has been subjected to hot stamping and is to be subjected to phosphating treatment. In a case where zinc phosphate treatment (phosphating treatment) is performed on this steel, Mg and Ca are diffused into the phosphate coating and the phosphate coating 4, which comprises zinc phosphate crystals containing 5.0 to 50.0 mass % of Mg and 0.5 to 5.0 mass % of Ca, is formed. FIG. 2 shows a typical structure photograph of the phosphate coating 4 of the hot stamped steel 1 according to this embodiment. The phosphate coating 4 comprises zinc phosphate crystals 11 containing 5.0 to 50.0% of Mg and 0.5 to 5.0% of Ca, and the zinc phosphate crystals 11 have the scale-like shape of which the grain size is 10 µm or less on a major axis and 5 µm or less on a minor axis. Further, in a case where the zinc phosphate crystals 11 are formed, the proportion of defect in phosphate coating is 10% or less. Furthermore, since the phosphate coating itself containing Mg is excellent in corrosion resistance, the phosphate coating contributes to the improvement of adhesion (coating film adhesion) after coating as compared to the phosphate coating not containing Mg.

In a case where an oxide film containing Ca and Mg is not formed sufficiently on the surface of the steel on which phosphating treatment is to be performed, an Al oxide is generated, so that the defect in phosphate coating of the phosphate coating 4 becomes large. In a case where the Mg content and the Ca content of the phosphate coating are low, the corrosion resistance of the phosphate coating is reduced, so that coating film adhesion is reduced.

On the other hand, in a case where the Mg content and the Ca content are high, the corrosion resistance of the phosphate coating is rather reduced, so that coating film adhesion is reduced.

Depending on conditions for hot stamping or the thickness of the plated layer, Fe, which is diffused into the plated layer by being alloyed, may be present in the phosphate coating comprised of zinc phosphate crystals.

The phosphate coating is dissolved by a chemical that dissolves only the phosphate coating without dissolving the plated layer, for example, 20%-chromic acid, a solution in which the phosphate coating is dissolved is analyzed by ICP-atomic emission spectrometry, and the average composition of the phosphate coating is measured, so that the chemical composition of the phosphate coating is obtained. Alternatively, the chemical composition of the phosphate coating can be measured by preparing a calibration curve in advance and performing a quantitative analysis using fluorescent X-rays.

[The Adhesion Amount of the Phosphate Coating Per One Surface is 0.1 to 10 g/m$^2$]

In a case where the adhesion amount of the phosphate coating 4 per one surface is less than 0.1 g/m$^2$, an effect of improving coating film adhesion (adhesion in a case where a coating film is formed on the surface of the phosphate coating) is not obtained sufficiently. On the other hand, in a case where the adhesion amount of the phosphate coating 4 per one surface exceeds 10 g/m$^2$, cracks are likely to occur in the phosphate coating at the time of bending or the like, which causes the exfoliation of the coating film. For this reason, the adhesion amount of the phosphate coating 4 per one surface is set in the range of 0.1 to 10 g/m$^2$. The adhesion amount of the phosphate coating 4 per one surface is preferably in a range of 1.5 to 8.0 g/m$^2$.

In a case where the adhesion amount of the phosphate coating per one surface is obtained using a dissolution method, an opposite surface and end surfaces of the hot stamped steel other than a surface to be measured are sealed with a tape and the hot stamped steel is immersed in a dissolving solution to obtain a solution into which the phosphate coating formed on only one surface to be measured is exfoliated. Accordingly, the adhesion amount of the phosphate coating per one surface can be obtained from a change in weight before and after dissolution.

In a case where the adhesion amount of the phosphate coating per one surface is measured using fluorescent X-rays, the adhesion amount of the phosphate coating of only one surface can be required.

In the hot stamped steel 1 according to this embodiment, an oxide film may be further provided between the plated layer 3 and the phosphate coating 4. This oxide film is made of, for example, a calcium oxide or a magnesium oxide.

<Manufacturing Method>

As long as the hot stamped steel according to this embodiment has the above-mentioned characteristics without depending on a manufacturing method, the effects thereof are obtained. However, according to a manufacturing method including the following steps, the hot stamped steel can be stably manufactured. Accordingly, the manufacturing method is preferable.

That is, the hot stamped steel according to this embodiment can be obtained by a manufacturing method including:

(I) a plating step of obtaining a plated steel including a plated layer by immersing a steel in a plating bath;

(II) a hot stamping step of performing hot stamping on the plated steel subjected to the plating step; and (III) a chemical conversion step of performing phosphating treatment on the plated steel subjected to the hot stamping, (IV) in the plating step, the steel is cooled up to a room temperature during cooling after the immersion of the steel in the plating bath such that the average cooling rate in a temperature range of a bath temperature to 450° C. is set to 10° C./sec or higher, the average cooling rate in a temperature range of 450 to 350° C. is set to 7° C./sec or lower, and the average cooling rate in a temperature range of 350 to 150° C. is set to 4° C./sec or lower.

<Plating Step>
[Immersion in Plating Bath]

In the plating step, the steel, such as a steel sheet, used as an original sheet is immersed in the plating bath to form a plated layer on the surface of the steel.

With regard to conditions for immersion in the plating bath, for example, the surface of an original sheet to be plated is subjected to heating-reduction treatment in a temperature range of 600 to 940° C., and the steel is immersed in a plating bath having a bath temperature in the range of 500 to 750° C. for about 0.2 to 6 seconds after the steel is air-cooled using $N_2$ gas so that the temperature of the steel reaches "bath temperature+20° C.".

In a case where an immersion time is less than 0.2 seconds, the plated layer may not be sufficiently formed. On the other hand, in a case where an immersion time exceeds 6 seconds, the plated layer and the steel are excessively alloyed and a large amount of Fe is contained in the plated layer. In a case where excessive Fe is contained in the plated layer, it is difficult to inhibit the evaporation of Zn and Mg during the heating of hot stamping. For this reason, in a case where an immersion time exceeds 6 seconds, a phosphate coating having predetermined composition is not obtained by the subsequent chemical conversion step, so that the coating film adhesion of the hot stamped steel is reduced.

The plating bath may be set so as to include Zn, Al, Mg, and other elements according to the composition of the target plated layer 3. For example, the composition of the plating bath includes 30.00 to 75.00% of Al, 4.00 to 17.00% of Mg, and 0.20 to 2.00% of Si, and includes optional elements to be desired to be contained in the plated layer as necessary with a remainder of Zn and impurities.

[Cooling]

The average cooling rate in a temperature range of a bath temperature to 450° C.: 10° C./sec or higher In a method of manufacturing the hot stamped steel according to this embodiment, the plated steel is lifted from the plating bath and is then cooled such that the average cooling rate at a temperature up to 450° C. is 10° C./sec or higher. In a case where the average cooling rate in this temperature range is set to 10° C./sec or higher, the formation of an Al oxide on the surface of the plated steel can be inhibited.

The average cooling rate in a temperature range of 450 to 350° C.: 7° C./sec or lower After the above cooling, the plated steel is cooled such that the average cooling rate in a temperature range of 450 to 350° C. is set to 7° C./sec or lower.

In a case where a cooling rate in this temperature range is lowered to control the solidification structure, oxides of Mg and Ca, of which the Al content is low (for example, 10% or less), are formed on the surface of the hot stamped steel in a subsequent hot stamping step. As a result, in a case where phosphating treatment is performed, a phosphate coating, of which defect in phosphate coating is less and which contains Mg and Ca, is obtained.

Further, there is a concern that Zn (zinc) is evaporated due to hot stamping in the case of a zinc-based plated layer. However, although a detailed mechanism is not apparent, an intermetallic compound containing Al, Zn, Ca, and/or Si having an effect of inhibiting the evaporation of Zn and Mg, which are elements having high vapor pressure, is preferentially produced near the surface of the plated layer in the solidification structure controlled as described above. Accordingly, the evaporation of Zn and Mg during the heating of subsequent hot stamping can be inhibited.

The average cooling rate in a temperature range of 350 to 150° C.: 4° C./sec or lower In a case where the average cooling rate in a temperature range of 350 to 150° C. is set to 4° C./sec or lower after the above cooling, a solid solution of Al and Zn contained in the solidification structure is separated into an Al phase and a Zn phase. Accordingly, the melting point of the plated layer is lowered and an intermetallic compound containing Al, Zn, Ca, and/or Si is easily moved to the surface of the plated layer, which is in a molten state, during the heating of hot stamping. As a result, since the evaporation of Zn and Mg can be more efficiently inhibited, a phosphate coating containing Mg and Ca can be formed.

However, in a case where a cooling rate in a part of the temperature range is high even though the average cooling rate in a temperature range of 350 to 150° C. is 4° C./sec or lower, a preferable metallographic structure is not obtained. For this reason, it is preferable that the average cooling rate in a temperature range of 350 to 150° C. is 4° C./sec or lower, the average cooling rate in a temperature range of 350 to 250° C. is 4° C./sec or lower, and the average cooling rate in a temperature range of 250 to 150° C. is 4° C./sec or lower.

<Hot Stamping Step>

Hot stamping is performed on the plated steel (the steel including the base material and the plated layer formed on the surface of the base material) subjected to the plating step.

Conditions for hot stamping are not limited. However, for example, a method of heating a plated steel sheet to a temperature range of 750 to 1200° C., holding the plated steel sheet for 0 to 8 minutes, and then interposing the plated steel sheet between flat dies, which are at a temperature of about room temperature, and rapidly cooling the plated steel sheet can be used.

<Phosphating Treatment Step>

Phosphating treatment is performed on a formed article subjected to hot stamping. The phosphating treatment is not limited, and publicly-known zinc phosphate treatment may be used.

According to the manufacturing method, the hot stamped steel according to this embodiment can be obtained.

EXAMPLES

The invention will be more specifically described below using examples but is not limited to these examples.

Tables 1 to 3 show Examples disclosed in the invention. Various Zn—Al—Mg-based plating baths were prepared and then were used for the heating of hot stamping. A steel sheet (containing 0.2% of C and 1.3% of Mn) having a sheet thickness of 1.6 mm was used as the original sheet to be plated. After an original sheet is cut into 100 mm×200 mm, plating was performed by a batch-type hot-dip plating test device manufactured in-house. The temperature of the sheet was measured using a thermocouple spot-welded to the central portion of the original sheet to be plated.

The surface of the original sheet to be plated was subjected to heating-reduction treatment before immersion in the plating bath at a temperature of 800° C. in a $N_2$-5% $H_2$ gas atmosphere in a furnace in which an oxygen concentration was 20 ppm or less, and the original sheet to be plated was immersed in a plating bath having a bath temperature shown in Table 2 for about 3 seconds after the original sheet to be plated was air-cooled using $N_2$ gas so that the temperature of the sheet to be immersed reached "bath temperature+20° C.". After immersion in the plating bath, the sheet was lifted at a lifting speed of 20 to 200 mm/sec.

During lifting, the adhesion amount of the plated layer was controlled by N₂ wiping gas as shown in Table 2. After being lifted from the plating bath, the steel sheet was cooled to a room temperature from the temperature of the plating bath under the conditions shown in Table 2.

The heating of hot stamping and the rapid cooling using the dies were performed on the produced plated steel sheet. With regard to heating conditions, the plated steel sheet was inserted into a heating furnace having a temperature of 900° C., and was retained for 0 to 8 minutes after the temperature of the plated steel sheet reached "a temperature in the furnace-10° C.". Then, the plated steel sheet was interposed between flat dies, which were at a temperature of about room temperature, and was rapidly cooled, so that a formed article was produced.

As a result of investigation using the above-mentioned method, the chemical composition of the plated layer subjected to hot stamping was as shown in Table 1.

In No. 31, hot stamping was performed on a commercially available galvannealed steel sheet.

After that, a sample having a size of 50×100 mm (×sheet thickness) was collected from the steel subjected to hot stamping, and zinc phosphate treatment was performed on this sample according to SD5350 system (Standard of Nipponpaint Industrial Coatings Co., LTD.) to form a phosphate coating.

TABLE 1

| | | Manufacturing method Chemical composition of plated layer (mass %) | | | | | | | |
|---|---|---|---|---|---|---|---|---|---|
| | | | | | | | | Others | |
| No. | Classification | Zn | Al | Mg | Si | Ca | Fe | Type | Sum |
| 1 | Comparative Example | 47.80 | 19.40 | 12.10 | 0.40 | 0.80 | 19.50 | — | 0.00 |
| 2 | Comparative Example | 53.40 | 20.60 | 4.20 | 0.20 | 1.00 | 20.60 | — | 0.00 |
| 3 | Invention Example | 52.00 | 20.00 | 6.00 | 0.40 | 1.50 | 20.00 | Ni: 0.10 | 0.10 |
| 4 | Comparative Example | 38.50 | 20.00 | 20.00 | 0.40 | 1.00 | 20.10 | — | 0.00 |
| 5 | Invention Example | 47.00 | 22.50 | 6.50 | 0.50 | 1.00 | 22.50 | — | 0.00 |
| 6 | Invention Example | 35.45 | 25.90 | 11.00 | 0.60 | 1.00 | 26.00 | Sb: 0.05 | 0.05 |
| 7 | Invention Example | 38.05 | 27.50 | 6.50 | 0.40 | 0.05 | 27.50 | — | 0.00 |
| 8 | Invention Example | 26.70 | 27.50 | 14.50 | 0.40 | 3.00 | 27.90 | — | 0.00 |
| 9 | Invention Example | 31.74 | 29.50 | 8.50 | 0.15 | 0.10 | 30.00 | Ti: 0.01 | 0.01 |
| 10 | Invention Example | 29.50 | 29.30 | 8.50 | 0.60 | 1.00 | 30.10 | Cu: 1.00 | 1.00 |
| 11 | Comparative Example | 30.37 | 30.00 | 8.50 | 0.60 | 0.03 | 30.50 | — | 0.00 |
| 12 | Comparative Example | 27.90 | 31.00 | 8.30 | 0.60 | 1.00 | 31.20 | — | 0.00 |
| 13 | Comparative Example | 28.60 | 31.00 | 8.30 | 0.60 | 1.00 | 30.50 | — | 0.00 |
| 14 | Comparative Example | 29.70 | 31.00 | 8.30 | 0.00 | 1.00 | 30.00 | — | 0.00 |
| 15 | Comparative Example | 4.70 | 31.30 | 6.20 | 0.30 | 0.50 | 57.00 | — | 0.00 |
| 16 | Comparative Example | 28.00 | 31.00 | 8.30 | 0.50 | 1.00 | 31.20 | — | 0.00 |
| 17 | Invention Example | 20.08 | 31.00 | 14.00 | 0.40 | 3.00 | 31.50 | Pb: 0.02 | 0.02 |
| 18 | Invention Example | 28.10 | 31.00 | 8.30 | 0.40 | 1.00 | 31.20 | — | 0.00 |
| 19 | Invention Example | 30.30 | 31.00 | 5.00 | 1.10 | 1.00 | 31.50 | Mn: 0.10 | 0.10 |
| 20 | Invention Example | 21.58 | 33.00 | 8.00 | 2.00 | 1.20 | 34.20 | Sn: 0.02 | 0.02 |
| 21 | Comparative Example | 6.80 | 29.00 | 6.00 | 0.20 | 0.50 | 57.50 | — | 0.00 |
| 22 | Comparative Example | 18.10 | 33.30 | 8.00 | 0.60 | 6.00 | 34.00 | — | 0.00 |
| 23 | Invention Example | 19.29 | 34.50 | 7.80 | 2.00 | 1.40 | 35.00 | Cr: 0.01 | 0.01 |
| 24 | Invention Example | 12.90 | 37.00 | 7.50 | 2.00 | 2.10 | 38.00 | Ni: 0.50 | 0.50 |
| 25 | Invention Example | 12.30 | 38.30 | 6.20 | 2.00 | 2.30 | 38.90 | — | 0.00 |
| 26 | Invention Example | 9.50 | 39.40 | 6.10 | 2.00 | 2.50 | 40.10 | Mn: 0.40 | 0.40 |
| 27 | Comparative Example | 8.90 | 37.10 | 9.00 | 5.50 | 1.00 | 38.50 | — | 0.00 |

TABLE 1-continued

| | | Manufacturing method Chemical composition of plated layer (mass %) | | | | | | | |
|---|---|---|---|---|---|---|---|---|---|
| | | | | | | | | Others | |
| No. | Classification | Zn | Al | Mg | Si | Ca | Fe | Type | Sum |
| 28 | Invention Example | 14.90 | 38.30 | 4.80 | 2.00 | 1.00 | 39.00 | — | 0.00 |
| 29 | Invention Example | 2.48 | 45.00 | 4.50 | 2.00 | 1.00 | 45.00 | Sr: 0.02 | 0.02 |
| 30 | Comparative Example | 4.00 | 45.50 | 8.50 | 1.00 | 1.00 | 40.00 | — | 0.00 |
| 31 | Comparative Example | Galvannealed steel sheet | | | | | | | |

TABLE 2

| | | | Manufacturing method | | | | | |
|---|---|---|---|---|---|---|---|---|
| No. | Bath temperature (° C.) | Immersion time (sec) | Average cooling rate in temperature range of bath temperature to 450° C. (° C./sec) | Average cooling rate in temperature range of 450 to 350° C. (° C./sec) | Average cooling rate in temperature range of 350 to 250° C. (° C./sec) | Average cooling rate in temperature range of 250 to 150° C. (° C./sec) | Average cooling rate in temperature range of 350 to 150° C. (° C./sec) | Adhesion Amount of adhering phosphate coating per surface (g/m$^2$) |
| 1 | 520 | 3 | 15 | 5 | 2 | 2 | 2 | 40 |
| 2 | 530 | 3 | 15 | 5 | 2 | 2 | 2 | 45 |
| 3 | 530 | 3 | 15 | 5 | 2 | 2 | 2 | 42 |
| 4 | 600 | 3 | 15 | 5 | 2 | 2 | 2 | 48 |
| 5 | 580 | 3 | 15 | 5 | 2 | 2 | 2 | 42 |
| 6 | 580 | 3 | 15 | 5 | 2 | 2 | 2 | 25 |
| 7 | 550 | 3 | 15 | 5 | 2 | 2 | 2 | 44 |
| 8 | 600 | 3 | 15 | 5 | 2 | 2 | 2 | 45 |
| 9 | 570 | 3 | 15 | 5 | 2 | 2 | 2 | 46 |
| 10 | 570 | 3 | 15 | 5 | 2 | 2 | 2 | 120 |
| 11 | 570 | 3 | 15 | 5 | 2 | 2 | 2 | 40 |
| 12 | 570 | 3 | 15 | 15 | 2 | 2 | 2 | 41 |
| 13 | 570 | 3 | 5 | 5 | 2 | 2 | 2 | 41 |
| 14 | 570 | 3 | 15 | 5 | 2 | 2 | 2 | 41 |
| 15 | 570 | 16 | 15 | 5 | 2 | 2 | 2 | 190 |
| 16 | 570 | 3 | 15 | 5 | 5 | 5 | 5 | 44 |
| 17 | 600 | 3 | 15 | 5 | 2 | 2 | 2 | 44 |
| 18 | 570 | 3 | 15 | 5 | 2 | 2 | 2 | 22 |
| 19 | 570 | 3 | 10 | 5 | 2 | 2 | 2 | 42 |
| 20 | 590 | 3 | 15 | 5 | 2 | 2 | 2 | 31 |
| 21 | 570 | 3 | 15 | 5 | 20 | 2 | 4 | 36 |
| 22 | 590 | 3 | 15 | 5 | 2 | 2 | 2 | 41 |
| 23 | 600 | 3 | 15 | 5 | 2 | 2 | 2 | 35 |
| 24 | 630 | 3 | 15 | 5 | 2 | 2 | 2 | 34 |
| 25 | 650 | 3 | 15 | 5 | 2 | 2 | 2 | 31 |
| 26 | 650 | 3 | 15 | 5 | 2 | 2 | 2 | 35 |
| 27 | 650 | 3 | 15 | 5 | 2 | 2 | 2 | 30 |
| 28 | 680 | 3 | 15 | 5 | 2 | 2 | 2 | 35 |
| 29 | 680 | 3 | 15 | 5 | 2 | 2 | 2 | 36 |
| 30 | 690 | 3 | 15 | 5 | 2 | 2 | 2 | 30 |
| 31 | Galvannealed steel sheet | | | | | | | |

<Evaluation of Phosphate Coating>

In order to investigate the phosphate coating, the produced sample was dissolved by 20%-chromic acid, a solution in which the phosphate coating was dissolved was analyzed by ICP-atomic emission spectrometry, and the average composition of the phosphate coating was measured. Further, the adhesion amount of the phosphate coating per surface was measured from a change in weight before and after dissolution.

Further, the surface of the plated steel sheet on which the phosphate coating was formed was observed using SEM, so that the proportion (area %) of defect in phosphate coating of the phosphate coating was measured. In this case, the area ratio of a region to which the steel sheet was exposed in a SEM-observed visual field was defined as the proportion of defect in phosphate coating. In a case where the proportion of defect in phosphate coating was 10 area % or less, it was determined that defect in phosphate coating was inhibited.

The sample subjected to the phosphating treatment was cut into 25 mm (C direction)×15 mm (L direction) and an SEM image of the surface of the sample was obtained. The shapes of zinc phosphate crystals were observed on the basis of this SEM image. As a result, it was confirmed in Invention example that the zinc phosphate crystals have the scale-like shape and have a grain size of 10 µm or less on the major axis and 5 µm or less on the minor axis.

<Coating Film Adhesion (Resistance to SDT)>

As described above, zinc phosphate treatment was performed on a sample having a size of 50×100 mm according to SD5350 system (Standard of Nipponpaint Industrial Coatings Co., LTD.), electrodeposition coating (PN110 Powernics Gray: Standard of Nipponpaint Industrial Coatings Co., LTD.) was performed so that the thickness of a coating film was 20 the sample was baked at a baking temperature of 150° C. for 20 minutes, a coated plated steel sheet having cross-cut portions (40×√2 mm, two) reaching the base material was immersed in 5%-NaCl salt water having a temperature of 55° C. for 1000 hours, an electrodeposition coating film was exfoliated by exfoliation using a tape, and the coating film adhesion of the hot stamped steel was then evaluated from the area ratio of a portion where exfoliation occurred and the state of generation of red rust.

Cases where the exfoliated area was 5% or less were evaluated as "AA", cases where the exfoliated area was larger than 5% and 10% or less were evaluated as "A", and cases where the exfoliated area exceeds 10% or a case where red rust occurred were evaluated as "B".

Results are shown in Table 3.

TABLE 3

| | | Phosphate coating (zinc phosphate crystals) | | | |
|---|---|---|---|---|---|
| No. | Adhesion amount of phosphate coating (g/m$^2$) | Mg content (mass %) | Ca content (mass %) | Defect in phosphate coating (area %) | Resistance to SDT |
| 1 | 7.2 | 6.0 | 0.6 | 15.0 | B |
| 2 | 6.5 | 3.0 | 0.4 | 11.5 | B |
| 3 | 2.3 | 18.6 | 0.6 | 2.0 | A |
| 4 | 2.4 | 51.5 | 1.2 | 11.0 | B |
| 5 | 2.5 | 20.1 | 1.6 | 1.0 | A |
| 6 | 3.1 | 32.9 | 1.2 | 0.0 | AA |
| 7 | 3.5 | 18.9 | 1.0 | 1.0 | AA |
| 8 | 4.1 | 46.0 | 5.0 | 0.0 | A |
| 9 | 2.6 | 31.2 | 0.5 | 0.0 | AA |
| 10 | 3.5 | 33.5 | 2.6 | 0.0 | AA |
| 11 | 2.1 | 5.5 | 0.4 | 10.1 | B |
| 12 | 1.5 | 4.1 | 0.3 | 10.5 | B |
| 13 | 1.9 | 4.6 | 0.5 | 11.6 | B |
| 14 | 2.1 | 4.9 | 0.7 | 15.2 | B |
| 15 | 2.1 | 2.1 | 0.1 | 22.9 | B |
| 16 | 1.6 | 4.0 | 0.2 | 10.1 | B |
| 17 | 2.1 | 49.9 | 2.6 | 0.0 | A |
| 18 | 3.2 | 31.5 | 2.8 | 0.0 | AA |
| 19 | 3.1 | 11.1 | 2.0 | 0.0 | A |
| 20 | 3.5 | 30.5 | 4.5 | 0.0 | AA |
| 21 | 2.2 | 1.5 | 0.2 | 21.0 | B |
| 22 | 3.6 | 2.0 | 0.2 | 15.3 | B |
| 23 | 4.0 | 31.5 | 4.2 | 0.0 | AA |
| 24 | 1.0 | 36.7 | 4.6 | 1.0 | AA |
| 25 | 2.5 | 20.1 | 4.1 | 2.0 | A |
| 26 | 3.5 | 18.9 | 4.8 | 2.0 | A |
| 27 | 2.6 | 0.0 | 0.0 | 10.1 | B |
| 28 | 4.1 | 5.2 | 4.8 | 3.2 | A |
| 29 | 3.2 | 5.1 | 4.9 | 3.5 | A |
| 30 | 2.5 | 5.1 | 4.1 | 18.5 | B |
| 31 | | Galvannealed steel sheet | | | B |

In each of Nos. 3, 5 to 10, 17 to 20, 23 to 26, 28, and 29 that were Invention examples, a plated steel sheet was produced under appropriate manufacturing conditions and hot stamping was performed, so that a phosphate coating containing Mg and Ca was formed on a plated layer. As a result, a hot stamped steel had excellent coating film adhesion.

FIG. 2 shows the SEM image (BSE image) of No. 10 of Tables 1 to 3. Since zinc phosphate crystals were formed on the surface of a sample, defect in phosphate coating in which zinc phosphate crystals were not formed was not seen. As a result of ICP-atomic emission spectrometry, 33.5% of Mg and 2.6% of Ca were contained in the zinc phosphate crystals.

Figure 3:
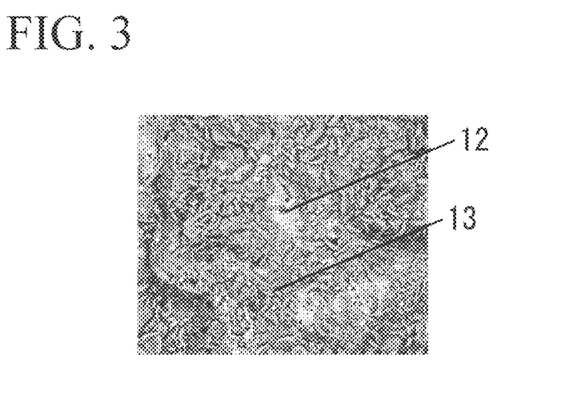
FIG. 3 is a diagram showing an example of the structure of a phosphate coating of a hot stamped steel of Example No. 12 (Comparative example).

On the other hand, in Comparative examples in which the chemical composition of the plated layer was not in the range of the invention or a manufacturing method was not preferable, the composition of the phosphate coating and/or the area ratio of defect in phosphate coating was large, so that coating film adhesion was low. For example, in No. 12, Ca and Mg were not contained in a zinc phosphate film 13 and many defect in phosphate coating 12 were also seen as shown in FIG. 3.

Further, coating film adhesion was inferior in No. 28 where hot stamping was performed on a commercially available galvannealed steel sheet.

BRIEF DESCRIPTION OF THE REFERENCE SYMBOLS

1: hot stamped steel
2: base material
3: plated layer
4: phosphate coating
11: zinc phosphate crystals containing Mg and Ca
12: defect in phosphate coating
13: zinc phosphate crystals not containing Mg and Ca

The invention claimed is:

1. A hot stamped steel comprising:
   a base material that is formed of steel;
   a plated layer that is formed on a surface of the base material; and
   a phosphate coating that is formed on a surface of the plated layer,
   wherein a chemical composition of the plated layer contains 20.00 to 45.00 mass % of Al, 10.00 to 45.00 mass % of Fe, 4.50 to 15.00 mass % of Mg, 0.10 to 3.00 mass % of Ca, 0.05 to 3.00 mass % of Si, 0 to 0.50 mass % of Sb, 0 to 0.50 mass % of Pb, 0 to 1.00 mass % of Cu, 0 to 1.00 mass % of Sn, 0 to 1.00 mass % of Ti, 0 to 0.50 mass % of Sr, 0 to 1.00 mass % of Cr, 0 to 1.00 mass % of Ni, and 0 to 1.00 mass % of Mn with a remainder of Zn and impurities, and
   the phosphate coating comprises zinc phosphate crystals and further comprises 11.1 to 49.9 mass % of Mg, and 0.5 to 5.0 mass % of Ca, and
   an adhesion amount of the phosphate coating per one surface is in a range of 0.1 to 10.0 g/m$^2$.

2. The hot stamped steel according to claim 1,
   wherein the chemical composition of the plated layer contains one or both of 25.00 to 35.00 mass % of Al and 6.00 to 10.00 mass % of Mg.

3. The hot stamped steel according to claim 2,
   wherein the adhesion amount of the phosphate coating per one surface is in a range of 1.5 to 8.0 g/m$^2$.

4. The hot stamped steel according to claim 1,
   wherein the adhesion amount of the phosphate coating per one surface is in a range of 1.5 to 8.0 g/m$^2$.

* * * * *